United States Patent [19]

Lapeyre et al.

[11] Patent Number: 4,958,720
[45] Date of Patent: Sep. 25, 1990

[54] SCREW CONVEYOR COUPLING APPARATUS

[75] Inventors: James M. Lapeyre, New Orleans; Peter G. Weber, LaPlace; Christopher G. Greve, Covington, all of La.

[73] Assignee: The Laitram Corporation, Harahan, La.

[21] Appl. No.: 354,803

[22] Filed: May 22, 1989

Related U.S. Application Data

[60] Division of Ser. No. 332,392, Apr. 3, 1989, which is a continuation of Ser. No. 58,393, Jun. 5, 1987, abandoned.

[51] Int. Cl.⁵ ............................................. B65G 33/32
[52] U.S. Cl. .................................... 198/666; 198/674; 198/677
[58] Field of Search ............... 198/659, 662, 664, 666, 198/674, 676, 677; 403/297

[56] References Cited

U.S. PATENT DOCUMENTS

| | | | |
|---|---|---|---|
| 2,226,078 | 12/1940 | Spahn | 403/297 |
| 2,571,036 | 10/1951 | Heyne et al. | 198/676 |
| 3,323,781 | 6/1967 | Murdock | 403/297 |
| 4,078,276 | 3/1978 | Nunes | 403/297 |
| 4,152,086 | 5/1979 | Achenbach et al. | 403/297 |
| 4,691,818 | 9/1987 | Weber | 198/666 |

Primary Examiner—Joseph E. Valenza
Attorney, Agent, or Firm—James C. Kesterson

[57] ABSTRACT

Readily attachable and detachable apparatus for coupling the drive shaft of a modular plastic screw conveyor with a power source is substantially concealed and protected by the modular plastic screw conveyor. Plastic screw conveyor modules define a non-circular axial aperture suitable for sliding over a matching or cooperating non-circular full length drive shaft. The drive shaft itself also includes an axial non-circular cross-section recess at one end for receiving a cooperating journal plug. The journal plug is retained in the drive shaft by a resilient axial force such as provided by a spring under tension, and such that rotation of the journal plug causes rotation of the drive shaft which in turn causes rotation of the plastic screw conveyor.

7 Claims, 5 Drawing Sheets

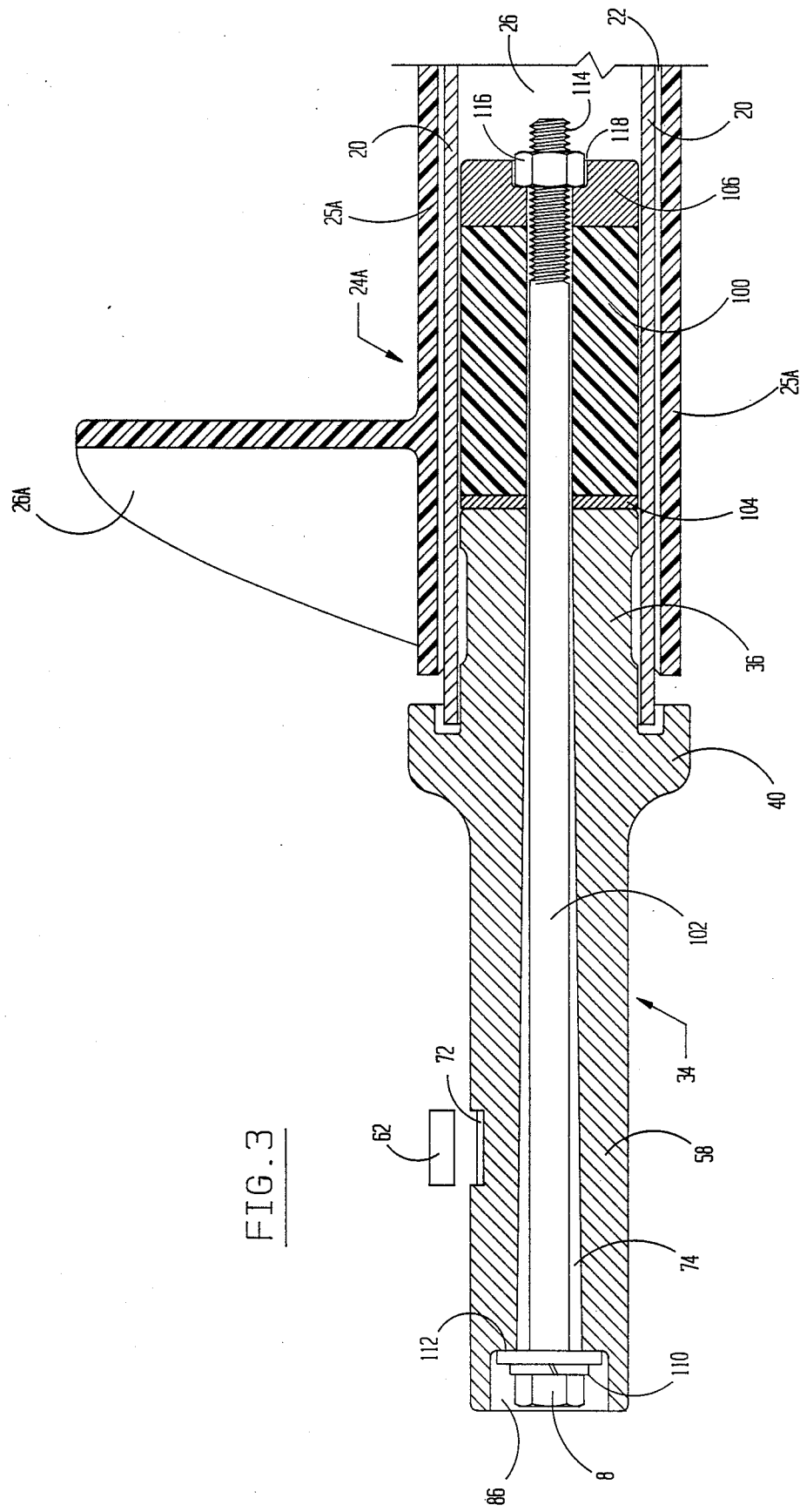

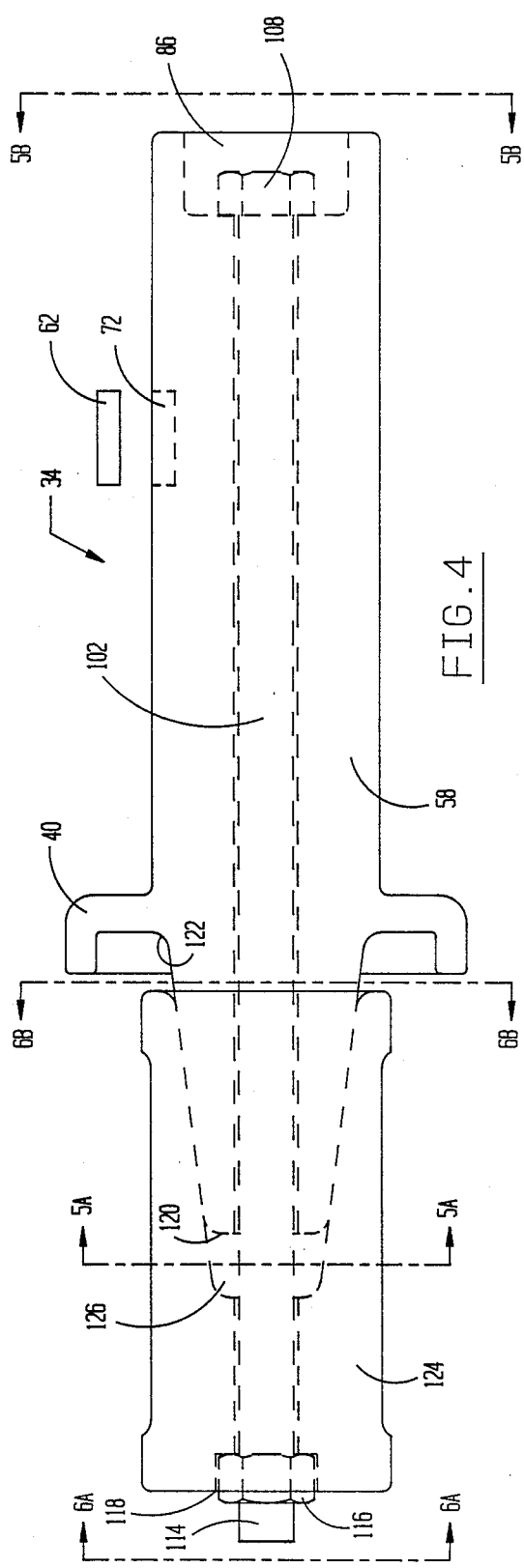
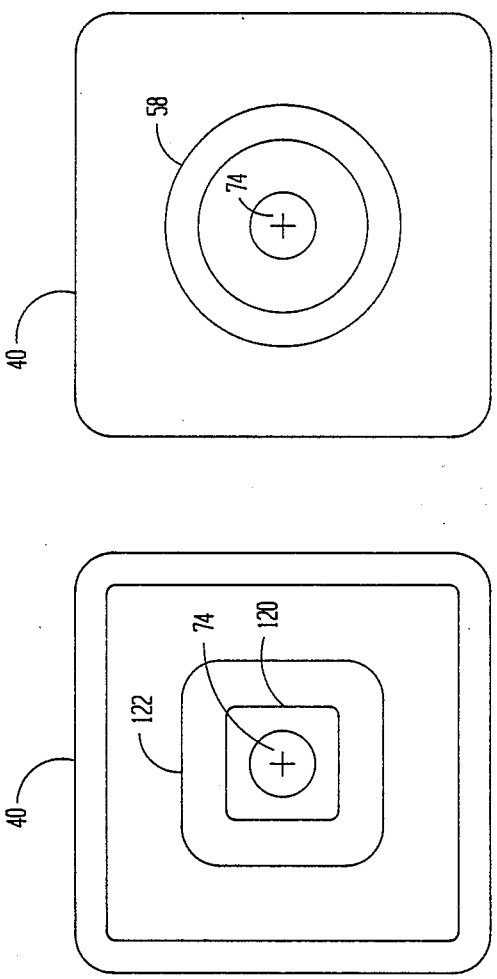
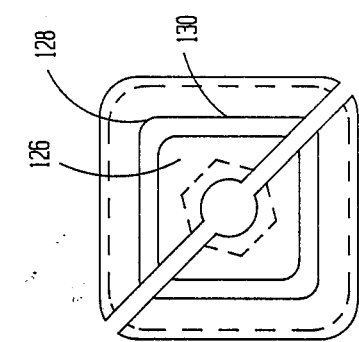

SCREW CONVEYOR COUPLING APPARATUS

This application is a Division of Application Ser. No. 332,392 filed Apr. 3, 1989 which was a Continuation of Application Ser. No. 058,393 filed June 5, 1987, now abandoned.

TECHNICAL FIELD

This invention relates to a system for coupling the drive shaft of a screw conveyor, and more particularly to a concealed coupling joining the drive shaft used with a modular integrally molded screw conveyor to a drive source. The components of the coupling are protected and located within the drive shaft itself. The coupling is readily attached or detached from the drive shaft, and once in place is completely enclosed and protected by the conveyor.

BACKGROUND ART

This application has related subject matter to that of the copending U.S. application Ser. No. 822,641 filed Jan. 27, 1986. It also has subject matter related to the U.S. copending application Ser. No. 044,358 filed Apr. 30, 1987.

As will be appreciated by those skilled in the art, specialized helical shaped devices such as screw conveyors are well known for the transport of various types of bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal, and each conveyor was specifically designed for a particular purpose and of a particular length. However, although most prior art conveyors were specifically designed to meet a particular application, there have been some attempts of providing a modular type conveyor of metal and wood. Examples of U.S. patents which disclose such modular conveyors include U.S. Pat. #349,233 issued to James Nelson on Sept. 10, 1886; U.S. Pat. #455,384 issued to H. Binkholz on July 7, 1891; U.S. Pat. #525,194 issued to J. Dyson, et al on Aug. 20, 1894; U.S. Pat. #546,879 issued to J. Dyson, et al on Sept. 14, 1895; U.S. Pat. #1,867,573 issued to D. G. Leach on July 19, 1932; U.S. Pat. #2,492,915 issued to A. B. Carlson on Dec. 27, 1949; U.S. Pat. #3,648,826 issued to Dean P. Brooks on Mar. 14, 1972 and U.S. Pat. #3,705,644 issued to Claude E. Kawchitch on Dec. 12, 1972. However, a study of the above patents indicates that only the two Dyson, et al patents, the Nelson patent and the Kawchitch patent can be considered sectional or modular. In addition, the assignee of the present application filed an application for Letters Patent on Sept. 29, 1983 for a "Modular Screw Conveyor" and which has Ser. No. 537,345, and on Apr. 4, 1984 filed an application for "Mold and Process for Manufacturing Helical Shaped Items" which has Ser. No. 598,374.

As will be appreciated, one of the advantages of the plastic modular screw conveyor is its ease of cleaning, etc. due to the smooth and non-interrupted surfaces. Also of course, by axially stacking any selected number of modules on the non-circular drive shaft a screw conveyor of any length can be fabricated. Further, it will be appreciated that by avoiding nuts and bolts which penetrate through the plastic screw conveyor and drive shaft, the conveying apparatus can be kept clean and free of debris and corrosion of the drive shaft substantially prevented. In addition, for certain U.S.D.A. applications the assemblage of individual modules must be sealed to each other at their end surfaces to eliminate any cavities etc. which might harbor bacteria. For such applications, a unitary drive shaft was normally necessary no matter how long the screw conveyor, since shaft couplings available at that time which used sleeves and bolts were unacceptable and would not provide the uninterrupted and crevice-free surfaces.

Therefore, it is an object of the present invention to provide a drive shaft coupling which can be used with a multiple module screw conveyor.

It is another object of the present invention to provide a drive shaft coupling which is completely enclosed and protected by the screw conveyor modules.

It is yet another object to provide a drive shaft coupling which is inexpensive and easy to assemble and disassemble.

SUMMARY

These and other objects and advantages will be obvious and will in part appear hereinafter, and will be accomplished by the present invention which provides a screw conveyor apparatus for coupling to the drive shaft of an integrally formed modular screw conveyor. The concealed coupling system comprises a drive shaft which has a first and further end, and an outside perimeter defining a first non-circular cross-section. The drive shaft also defines an aperture of a non-circular cross-section which extends axially from the first end toward the further end, and in a typical embodiment may extend completely to the second further end. The first end of the drive shaft defines a second aperture which extends from a first location on the perimeter, through the drive shaft and toward a second location on the perimeter. Typically, this second aperture may simply extend along a diameter through the drive shaft perpendicular to the longitudinal axis. An elongated coupling has a non-circular cross-sectional shape and size which is similar to the aperture extending through the drive shaft such that it is suitable for being received axially and slidably by the longitudinal aperture so as to join the drive shaft and the coupling means to prevent rotation between the two. The coupling means also defines a locking pin aperture which is located so as to be in register with the perpendicular aperture through the drive shaft when the coupling means is received by the drive shaft. A locking pin extends through the aperture from the first location in the drive shaft, into the locking pin aperture of the coupling means and then terminates at the aperture of the second location on the drive shaft. Typically, the locking pin will have a length substantially the same as the length of the aperture through the drive shaft. To hold the locking pin in place, an integrally formed screw conveyor module having an axially extending aperture of a cross-section suitable for receiving the drive shaft while preventing rotation therebetween is simply slid over the drive shaft so as to prevent movement of the locking pin out of the joined drive shaft and coupling means. The second end of the coupling means may cooperate in an identical manner with another drive shaft or a drive source. Thus, any number of drive shaft segments may be coupled to achieve a drive shaft of any desired length.

BRIEF DESCRIPTION OF THE DRAWINGS

The above features of the present invention will be more clearly understood from consideration of the following description in connection with the accompanying drawings in which;

FIG. 3 is a cross-sectional view of another embodiment of the invention showing a different type of journal plug and retainer means.

FIG. 4 is an assembled plan view of yet another embodiment of a journal plug and retainer means for use with the conveying apparatus of the present invention.

FIGS. 5A and 5B show two opposing end views of the journal plug of FIG. 3.

FIGS. 6A and 6B show two opposing end views of the retainer means of FIG. 3.

BEST MODE OF CARRYING OUT THE APPLICATION

Figure 1:
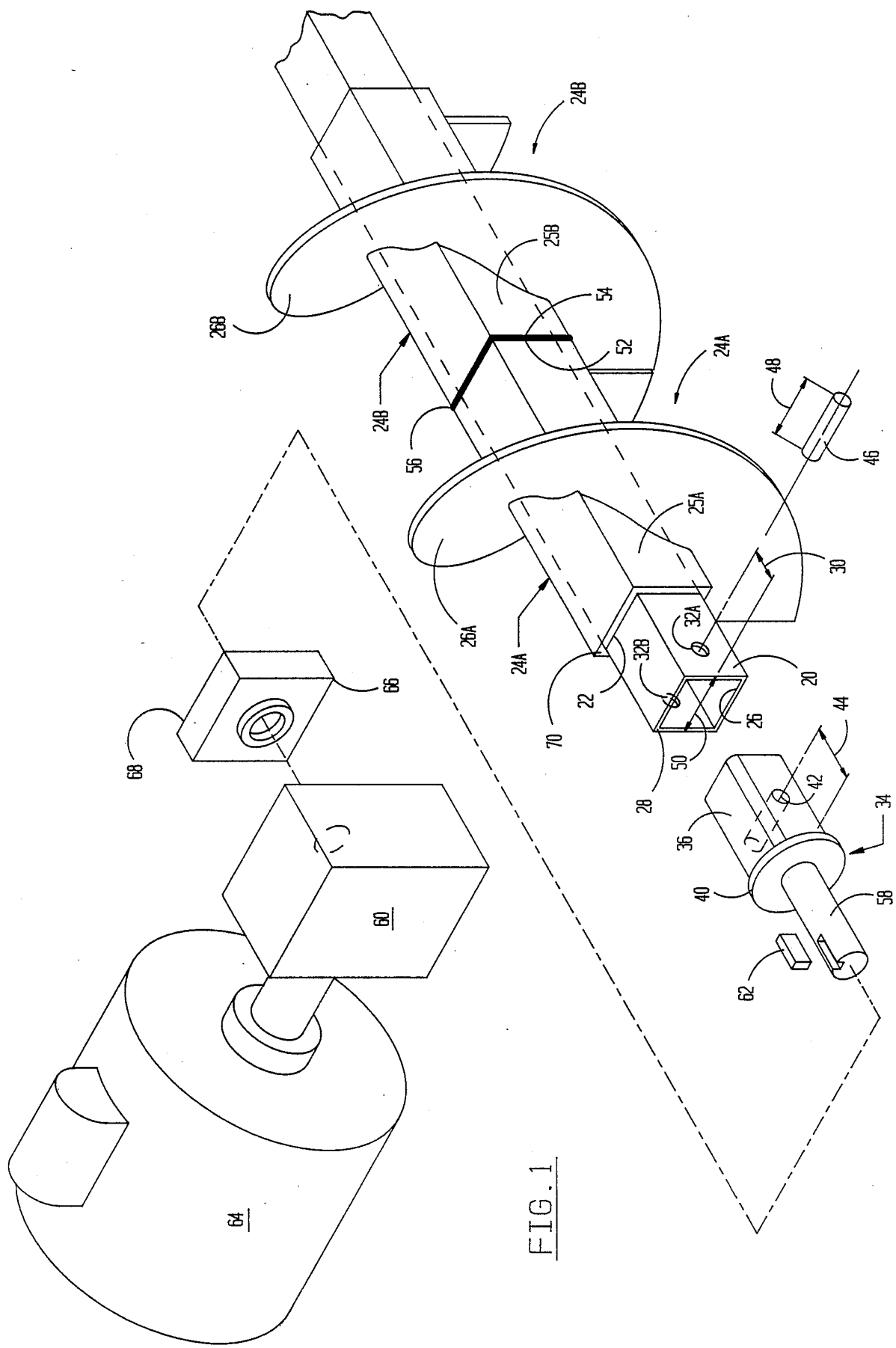
FIG. 1 is an exploded perspective view of one embodiment of the coupling apparatus of this invention showing the drive motor, the journal plug and the plastic screw conveyor modules.

Referring now to FIG. 1, there is shown a perspective exploded view of the coupling system of this invention. As shown, a pair of plastic screw conveyor modules 24A and 24B each include flight members 26A and 26B respectively, each of which helically encircle slightly less than 360° of their respective axial member and extends between the two ends of the axial members. Further, drive shaft 20 is suitable for being received in a non-circular aperture 22 located in the pair of plastic screw conveyor modules 24A & 24B. Also, shown, the perimeter of the drive shaft 20 has a outside cross-sectional area which is substantially the same as the cross-sectional area of the aperture through the axial members 25A and 25B of the screw conveyor modules 24A and 24B. It will be appreciated, however that although the outside perimeter of drive shaft 20 and the axial apertures of the screw conveying modules 24A and 24B are substantially the same in the embodiment shown in FIG. 1, it would be possible to use a drive shaft which would cooperate with the aperture of the screw conveyor module but not have precisely the same shape. For example, the aperture of a module shown in the Kawchitch patent is not identical to a drive shaft which is received by the module. It can further be seen that the drive shaft 20 also defines a longitudinal or axial aperture 26 which extends from the first end 28 toward the second end of the drive shaft. Although typically the drive shaft 20 will be completely hollow and the aperture 26 will extend completely from one end to the other, it will be appreciated that the aperture 26 could extend a short distance along the longitudinal axis and the remainder of the drive shaft could be solid. Spaced a selected distance from the first end 28 of drive shaft 20, and as indicated by double-headed arrow 30, there is a second aperture 32A-32B which is perpendicular to the longitudinal axis of the drive shaft and as shown extends perpendicular to the drive shaft. As can be seen, the aperture portion 32A defined by one of the four sides of the square shaped drive shaft 20 is in alignment with the second aperture portion 32B defined in an opposing side of the drive shaft.

Also as shown, a journal plug shown generally at 34 includes a first or connecting end 36 which has a shape suitable for being slidably received by aperture 26 of drive shaft 20. In the embodiment shown, the end 36 of journal plug 34 is generally of a square cross-sectional area similar to that of the aperture 26 cross-section except that the edges have been rounded off to allow for an easier fit. It will be appreciated of course that the end 36 could have an outside diameter cross-section which is precisely the same as that although slightly smaller than the aperture 26. Spaced from end 36 of journal plug 34 is a center band member 40. Also as shown, journal plug 34 defines an aperture 42 which is spaced from the center band member by a distance indicated by double-headed arrow 44 which distance is substantially the same as the distance indicated by double-headed arrow 30. Thus, it will be appreciated that when end 36 is located or positioned within aperture 26 of drive shaft 20, such that end 28 of the drive shaft is substantially in contact with center band member 40, aperture 42 is substantially in register with apertures 32A and 32B. It should be noted that aperture 42 is also located perpendicular to the longitudinal axis of coupling member 34 to achieve the in register position with the apertures 32A and 32B. Also as shown, aperture 42 has a diameter substantially the same as that of 32A and 32B. Thus, when the journal plug 34 is fully inserted within the drive shaft 20, and the aperture 42 is in register with apertures 32A and 32B, a locking pin 46 which has a diameter slightly smaller than the diameter of the apertures may be inserted in the in-register apertures such that axial movement is prevented. It should also be noted, that the length indicated by double-arrow 48 of locking pin 46 is substantially identical to the width of the drive shaft 20 as indicated by double-headed arrow 50. It will also be appreciated of course that because of the cooperating shapes of end 36 of coupling means 34 and the aperture 26, rotational movement between the two is also prevented. Further, by simply sliding the screw conveyor modules 24A and 24B forward such that end 28 of the module is also in contact with center ring 40 of the journal plug 34, it will be appreciated that locking pin 46 will be prevented from moving out of the apertures and thus the coupling is substantially enclosed and locked in place. As shown confronting ends 52 and 54 of the axial members 25A and 25B respectively of the screw conveyor modules 24A and 24B may be bonded or sealed together as indicated by weld bead 56 such that the coupling assembly is completely enclosed and protected by the two sealed screw conveyor modules. In the embodiment of FIG. 1, the flights of the two modules are not bonded or welded, but it will be appreciated that for some applications bonding of the flight modules may be desired. In the arrangement shown, the metal drive shaft and journal plug can be protected from corrosive materials. Further, in certain applications the Federal Government requires the absence of cavities and crevices which can harbor bacteria. Thus, by using the bead to seal the end sections and the ends of the flight, a continuous smooth and uninterrupted surface for conveying products requiring USDA approval can be achieved.

Also as shown, the end 58 opposite end 36 of journal plug 34 may be a keyed round shaft suitable for being connected to a speed reduction box 60 by key 62. Reduction box 60 is in turn connected to a drive motor 64. It will be appreciated of course that instead of being connected to a drive motor by speed reduction box 60, the end 58 could have mounted thereon a pulley and be driven by a belt and the like. Also as shown, there is a plastic end cap 66 having a perimeter corresponding to the axial member 25A of screw conveyor module 24A. End cap 66 has a contact edge 68 which may be sealed or welded to the end 70 of the screw conveyor module 24A so as to further eliminate crevices etc. which could collect bacteria.

Figure 2:
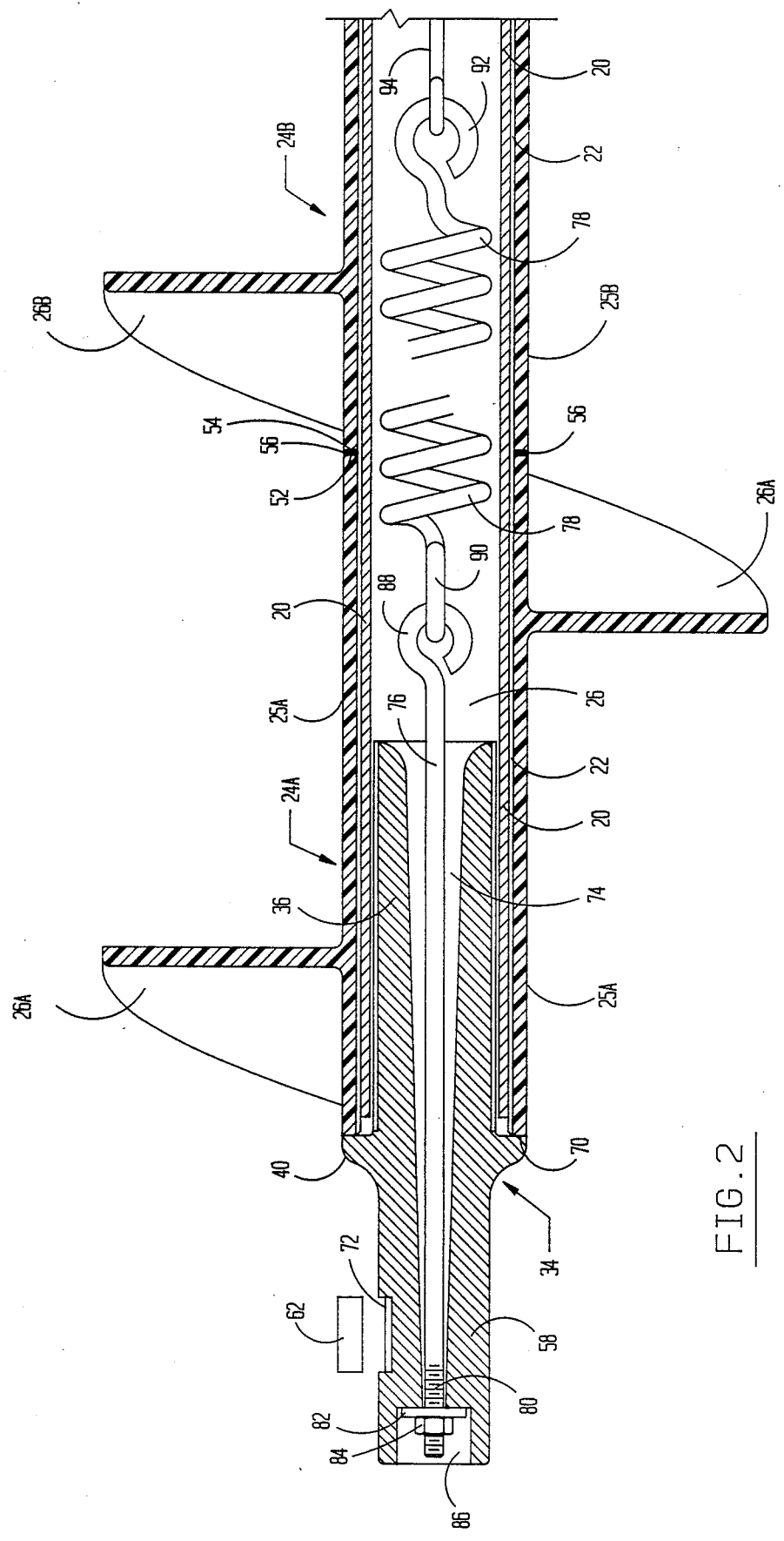
FIG. 2 is an assembled cross-sectional view of another embodiment of the invention showing a drive shaft and a different journal plug and retainer means in cooperation with two screw conveyor modules bonded to each other.
Figure 7:
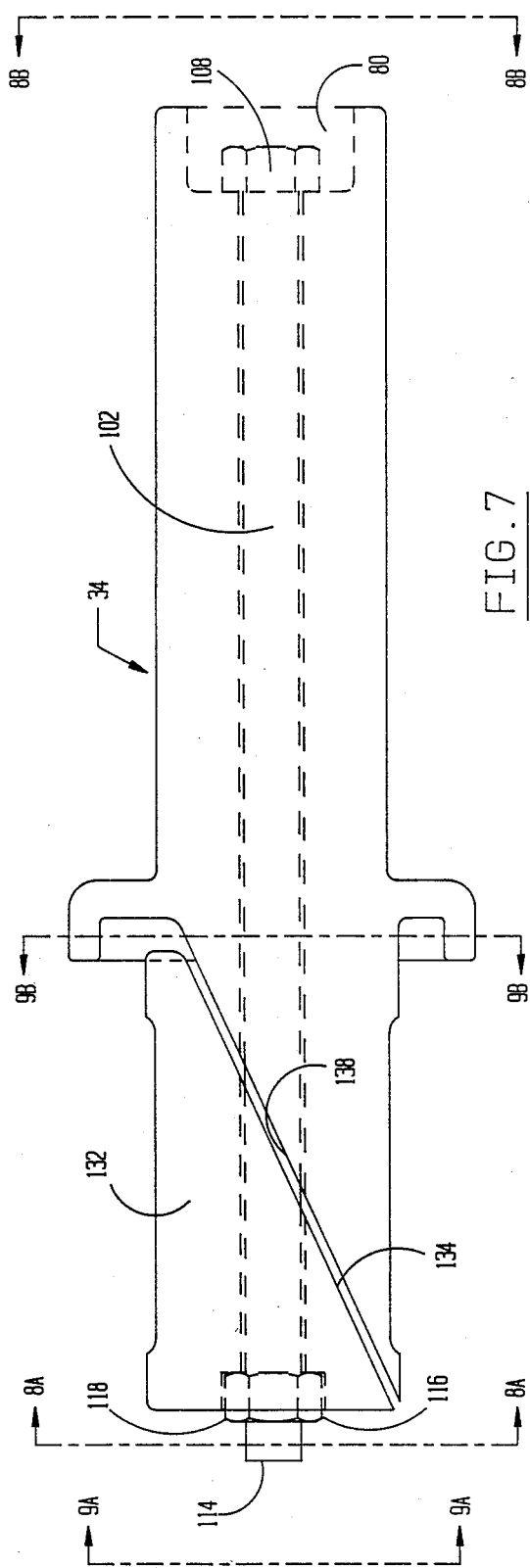
FIGS. 7, 8A, 8B, 9A and 9B show, an assemble plan view and perspective views of opposing end views of another journal plug and retainer means respectively.
Figure 8B:
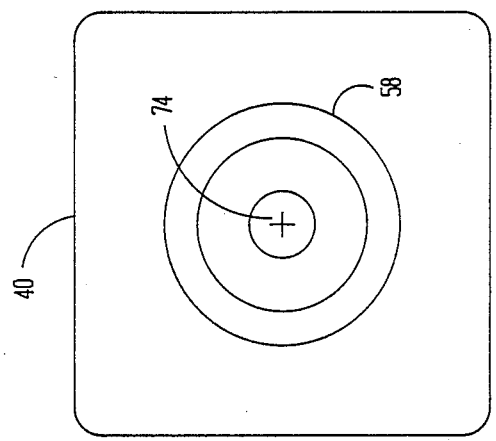
Figure 8A:
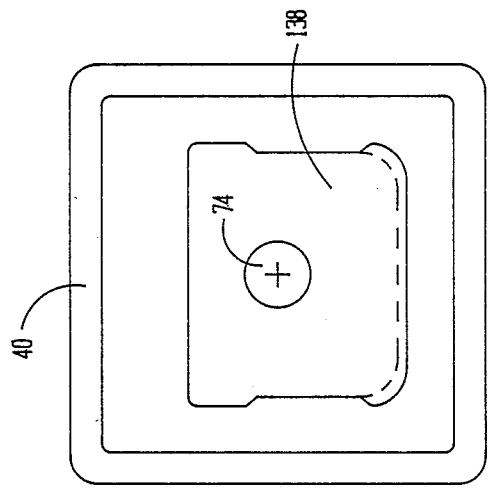

Referring now to FIG. 2, there is shown a cross-sectional view of another embodiment of the present invention. Those elements or portions of the embodiment of FIG. 2 which are similar or common to the coupling apparatus of FIG. 1 carry the same reference numbers. Also as will become apparent from the discussions of FIGS. 3 through 9, common elements of those embodiments also carry the same reference numbers. As shown a pair of axially aligned screw conveyor modules 24A and 24B include axial members 25A and 25B respectively which define aperture 22 which extends the length and along the axis of the axial member. Aperture 22 of each of the modules has a non-circular cross-section (such as a square cross-section) which is positioned so as to be in-register with the aperture of the axially aligned adjacent module. Thus the aligned apertures of the modules are suitable for receiving an elongated drive shaft 20 having a perimeter cross-section of a cooperative non-circular shape such that rotation of the drive shaft 20 causes rotation of the screw conveyor modules 24A and 24B. Although the perimeter cross-section of the drive shaft may be of any suitable size and shape which cannot freely rotate within aperture 22 of the modules, typically the perimeter cross-section of the drive shaft will be the same but slightly smaller, than the cross-section of the aperture.

As shown, drive shaft 20 also includes a non-circular aperture 26 which typically extends the length of drive shaft 20. Although not necessary, since drive shaft 20 is normally a square or hexagon tubular member of uniform wall thickness, the non-circular shape of aperture 26 typically will be the same square or hexagon shape, but smaller due to wall thickness, as the square or hexagon perimeter cross-section of drive shaft 20. Journal plug 34 includes a mounting end 36 which also has a non-circular shape suitable for being slidably received in a non-rotatable manner by the aperture 26 of drive shaft 20. As was discussed above with respect to the cross-section of aperture 22 of the modules and the perimeter cross-section of drive shaft 20, these two cooperating non-circular shapes of aperture 26 of the drive shaft 20 and the cross-section of mounting end 36 of journal plug 34 are usually, but not necessarily, the same. The important consideration is that rotation of journal plug 34 along its longitudinal axis will cause rotation of drive shaft 20 and consequently modules 24A and 24B. As shown, intermediate located center band or collar 40 separates mounting end 36 from drive end 58 of journal plug 34. Drive end 58 typically has a circular cross-section with a keyway 72 for receiving key 62. Rotational force can then be applied to the combination of key 72 and drive end 58 of journal plug 34 by any suitable means such as a gear box or pulley assembly as discussed heretofore with respect to the embodiment of FIG. 1. Extending axially the full length of journal plug 34 is a tapered aperture 74 which receives an elongated eyebolt 76 connected to a tensional spring 78 for retaining mounting end 36 of journal plug 34 in aperture 26 at the end of drive shaft 20. As shown in the embodiment of FIG. 2, elongated eyebolt 76 includes a threaded end 80 which cooperates with a washer 82 and nut 84 to attach the eyebolt to journal plug 34 when tensional forces are applied by spring 78. In the embodiment shown, threaded end 80, washer 82 and nut 84 are located in end recess 86 of the drive end 58 of drive shaft 20. The eye portion 88 located at the opposite end of the elongated center portion of eyebolt 76 is simply hooked to end 90 of spring 78 which as shown is located in the axial aperture of drive shaft 20. The opposite end 92 of spring 78 may be attached to drive shaft 20 by any suitable manner, or preferably attached by a wire 94 to a similar journal plug and eyebolt (not shown) at the other extreme end (not shown) of drive shaft 20. Thus it will be appreciated that journal plug 34 is resiliently mounted within aperture 26 of drive shaft 20 when retained in position in the manner shown in the embodiment of FIG. 2.

Referring now to FIG. 3, there is shown another cross-sectional view of yet another embodiment of the present invention wherein the journal plug is maintained in position by a different type of retainer means. As shown, a screw conveyor module 24A is in place around a non-circular drive shaft 20. As was discussed heretofore the axial member 25A of the screw conveyor module 24A defines a non-circular aperture 22 having a cross-section which cooperates with the perimeter cross-section of the drive shaft 20 such that rotation of the drive shaft causes rotation of the screw conveyor module.

As was discussed heretofore with respect to the previous embodiments, the drive shaft 20 includes a non-circular aperture 26 which extends the length of drive shaft 20, and journal plug 34 includes a mounting end 36 which cooperates with the aperture 26. In a manner also discussed heretofore, the drive end 58 of journal plug 34 typically has a circular cross-section with a keyway 72 which receives the key 62 such that the journal plug and consequently the drive shaft and plastic modules may be rotated by a suitable driving mechanism which can impart rotational motion to the drive end of journal plug 34. In a similar manner as was discussed heretofore, journal plug 34 further includes a tapered aperture 74 which extends axially and completely therethrough. However, unlike the embodiment discussed with FIG. 2, instead of an eyebolt joined to a tensional spring combination, a different technique for securing the journal plug in position in the drive shaft end is shown. As shown, there is located at the mounting end 36 of journal plug 34 a resilient member 100 such as a rubber or plastic-like member which also has an elongated aperture extending through member 100 and along the axis thereof. The cross-section of the resilient member 100 taken along a plane perpendicular to the axis of the axial aperture, will be substantially the same as the cross-section of the aperture of drive shaft 20. Further, although in the embodiment shown in FIG. 3 the resilient member 100 is shown as a single elongated member, it will be appreciated that resilient member 100 could comprise a stack of washer-like resilient members placed around elongated bolt 102. In the embodiment shown, there is also included a separation washer 104 which will have a perimeter shape substantially the same as the cross section of aperture 26 of drive shaft 20. In a similar manner, a compression plug 106 is located at the other end of the elongated resilient member 100 and preferably also have a perimeter shape substantially the same as the cross-sectional shape of aperture 26 of drive shaft 20. Further as is clear from the embodiment of FIG. 3, the elongated bolt 102 having a head 108 is contained in recess 86 of the driving end 58 of journal plug 34. Also as shown, one or more washers 110 provide a bearing surface for the head 108 against shoulder 112 of the elongated aperture 74. At the opposite end of elongated bolt 102, the threaded end 114 receives a standard nut 116 which is held in a non-rotating position by recess 118 defined by compression plug 106. In a typical embodiment, recess 118 will have a cross-sectional shape which cooperates with the perimeter shape of nut 116 such that rotation is not of the nut within recess 118 is not possible. Thus, when the complete journal plug 34 along with the resilient elongated member 100, the blocking plug 106 and the bolt 102 with nut 116 is loosely inserted within aperture 26 of drive shaft 20, it is easily received in a sliding manner. However, once in place by simply tightening bolt 108 it will be appreciated that the compression plug 106 will compress the resilient member 100 between itself and the separation washer 104. Therefore being made of a resilient material, the member 100 will be compressed axially which will in turn cause significant expansion radially of member 100 against the sidewalls of the aperture 26 of drive shaft 20. Thus by forcefully continually tightening the bolt 108, the axial compression of resilient member 100 accompanied by its radial expansion will securely bind the journal plug and associated components in place such that it cannot be removed from aperture 26. However, if removal is desired it is a matter of simply loosening the bold 108 with respect to nut 116 to relieve the axial pressures on resilient member 100 such that the radial expansion is relieved and the combination readily removed from the drive shaft. Thus, it will be appreciated that still another technique for attaching a journal plug to a conveying apparatus has been shown.

Referring now to FIGS. 4, 5A, 5B, 6A and 6B there is shown still another embodiment of a coupling means for attaching a journal plug to a conveyor apparatus according to the principles of this invention. The embodiment shown in FIGS. 4 through 6B is similar to that discussed heretofore with respect to FIG. 3, except that instead of using a resilient compressible member 100 the retaining member is a split non-resilient member (typically metal), which because of its structure when tightened in a manner discussed above with respect to FIG. 3 also expands inside of the drive shaft 20. In the embodiment shown in FIGS. 4 through 6B, the plastic conveyor modules and the drive shafts 20 as was discussed heretofore are not shown. However, it will be appreciated that the operation of those members would be the same as already discussed. As shown, the drive end 58 of the journal plug 34 operates substantially the same as discussed heretofore with respect to FIG. 3. However, as can be seen the mounting end has a substantially different configuration. Referring now to FIG. 5A which is a view of the journal plug 34 taken along lines 5A—5A it can be seen that there is starting at the end 120 a square cross-section which is inclined towards the drive end to a larger cross-sectional area indicated by the square cross-section 122 as seen in FIG. 5A. Thus, the section between 120 and 122 of journal plug 34 has the appearance of a truncated square pyramid. Also as can be seen, there is an axial aperture 74 extending through journal plug 34. Cooperating with the "truncated pyramid" section of the mounting end of journal plug 34, there is a split retainer means indicated generally at 124 and more specifically as 124A and 124B. As can more clearly be seen in FIGS. 6A and 6B, the two sections 124A and 124B of the retaining means has a perimeter outline or cross-section which is substantially the same although slightly smaller than the cross-section of the aperture defined in a cooperating drive shaft (not shown). In the example shown the drive shaft would of course be square. As can more clearly be seen in FIG. 6B, the two halves 124 and 124B of the retainer means define a truncated square pyramidal shaped recess 126 which includes an incline or ramp area extending from the base of the pyramid 128 to the top of the truncated pyramid 130. Again, it is noted that this is a recess having the shape of a truncated square pyramid and not a projection with such a shape. Therefore, it will be appreciated that when the two halves of the retainer 124 are properly located such that that the pyramidal shaped aperture 126 receives the truncated pyramid shape of the mounting end of journal plug 34, axially expansion or separation of the two members 124A and 124B will occur when the elongated bolt 102 is tightened with respect to nut 116. Thus as shown, the split retainer means 124 is placed within the drive shaft of a screw conveyor apparatus with nut 116 loose enough on bolt 108 such that the combination retainer and journal plug readily slides within the aperture. Once in place the bolt 103 is then tightened putting compression forces on the split retainer 124 such that the inclined surfaces of the retainer 124A and 124B cooperate with the inclined surfaces of the truncated pyramid on the mounting end of journal plug 58 to cause separation and thereby perimeter expansion of the two retainer halves 124A and 124B. Tightening of the bolt 108 is then continued until the expansion of retainer 124 securely binds itself against the interior walls of a drive shaft (not shown). Thus it will be appreciated that the operation of this embodiment is similar to that discussed heretofore with respect to FIG. 3 except when the split retainer 124 takes the place of the resilient member 100.

Figure 9B:
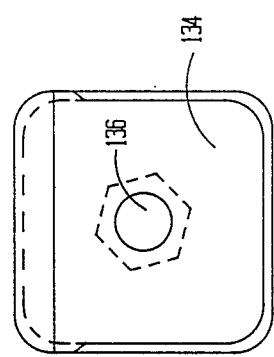
Figure 9A:
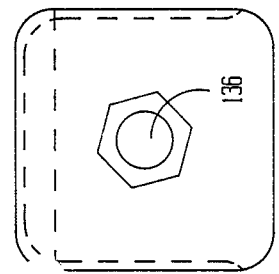

Finally, referring now to FIGS. 7, 8A, 8B, 9A and 9B there is shown another embodiment substantially similar to that discussed with respect to FIGS. 4 through 6B. The operation of the journal plug retainer means is substantially the same as that discussed above except that instead of using a split retainer member 124, the retainer means is a wedge shaped member 132, which when viewed axially from either end as indicated by FIGS. 9A and 9B has a substantially square cross-section with an incline or ramp surface 134. Also as can be seen, there is an axial aperture 136 extending the length of the member. Further, and unlike the embodiment discussed with respect to FIGS. 4 through 6B, the mounting end of journal plug 34 also has a cross-sectional area substantially square for cooperating with the aperture in a companion drive shaft. In addition, and of utmost importance the mounting end of journal plug 34 also includes a ramp surface 138 which cooperates with the ramp surface 134 of retainer means 132. Thus in a similar manner to that discussed above, when bolt 108 is tightened with respect to nut 114, the combination journal plug 34 and the retainer means 132 are placed in compression. The compressive forces causes the two inclined surfaces or ramp surfaces 134 and 138 to slide with respect to each other such that the overall perimeter shape of the combination of the journal plug 34 and retainer 132 is expanded. Thus, when placed in a drive shaft having a similar aperture running the length of the drive shaft, the expansion of the combination journal plug and retainer means will bind the journal plug to the inside of the walls of the drive shaft in a manner discussed heretofore with respect to FIGS. 3 and 4. Therefore, there have been described to this point various techniques, apparatus and methods for coupling a journal plug to a screw conveyor drive shaft which are concealed within the drive shaft and require no apertures extending radially through the plastic screw conveyor or the drive shaft.

Thus, although there has been described to this point particular embodiments of the drive shaft coupling system for use with screw conveyor modules, it is not intended that such references be considered as limitations upon the scope of this invention except insofar as set forth in the following claims.

We claim:

1. Screw conveying apparatus including a modular screw conveyor having a multiplicity of integrally formed modules, said modular screw conveyor also including a combination axial member extending a selected length, and a flight member helically encircling more than 360° of said combination axial member and extending said selective length, said apparatus comprising:

at least two substantially similar integrally molded plastic modules, each module including an elongated axial member extending between a pair of ends and defining an aperture having a cross-section of a first non-circular shape extending coaxially therethrough, each module further including a flight member which helically encircles not more than 360° of said axial member and extends between said pair of ends, at least one end of one of said at least two modules formed to cooperate with an adjacent end of the other one of said at least two modules;

said multiplicity of modules being aligned coaxially such that, except for modules on the extreme ends, each end of each module is in axial confronting relationship with an end of an adjacent module and such that said aperture of each of said multiplicity is in register with the aperture of an adjacent module so as to define a modular screw conveyor having an elongated aperture of a non-circular cross-section extending said selected length and including a flight member which encircles more than 360° of said combination axial member and substantially extends the length of said aligned modules;

an elongated drive shaft having a perimeter cross-section of a second non-circular shape extending axially through and cooperating with the in-register apertures of said aligned multiplicity of modules such that rotation of said drive shaft causes rotation of said screw conveyor, said drive shaft further including an aperture extending coaxially from at least one end of, and into said drive shaft, said aperture in said drive shaft being smaller than said perimeter cross-section and having a cross-section of a third non-circular shape;

a journal plug having a mounting end and a drive end and defining an aperture extending axially therethrough, said mounting end of said journal plug defining a size and shape such that rotation of said journal plug causes rotation of said drive shaft;

an attaching means having a first portion connected to said journal plug and a second portion extending coaxially within said aperture of said journal plug; and tension means attached to said second portion for applying an axial force to said attaching means in a direction so as to resiliently maintain said journal plug within said aperture of said drive shaft.

2. The screw conveying apparatus of claim 1, wherein each of said confronting ends of said adjacent modules are bonded to each other in a liquid tight manner.

3. The screw conveying apparatus of claim 1, wherein said first and second non-circular shapes are substantially the same in size and shape.

4. The screw conveying apparatus of claim 1 wherein said third non-circular shape is substantially the same in size and shape as said mounting end of said journal plug.

5. The screw conveying apparatus of claim 1, wherein said attaching means is an elongated eyebolt and said tension means is a tensional spring extending coaxially through said drive shaft.

6. The screw conveying apparatus of claim 1 wherein said journal plug includes an intermediate section between said mounting end and said drive end and has at least one cross-sectional dimension greater than a corresponding cross-sectional dimension of said second non-circular shape.

7. Screw conveying apparatus including a modular screw conveyor having a multiplicity of integrally formed modules, said modular screw conveyor defining a combination axial member extending a selected length, and a flight member helically encircling more than 360° of said combination axial member and extending said selective length, said apparatus comprising:

at least two substantially similar integrally molded plastic modules, each module including an elongated axial member extending between a pair of ends and defining an aperture of a non-circular cross-sectional shape extending coaxially therethrough, each module further including a flight member which helically encircles not more than 360° of said axial member and extends between said pair of ends, at least one end of one of said at least two modules suitable for bonding with an adjacent end of the other one of said at least two modules;

said multiplicity of modules being aligned coaxially such that, except for modules on the extreme ends, each end of each module is in axial confronting relationship with an end of an adjacent module and such that said aperture of each of said multiplicity is in register with the aperture of an adjacent module so as to define a modular screw conveyor having an elongated aperture of said non-circular cross-section extending said selected length and including a flight member which encircles more than 360° of said combination axial member and substantially extends the length of said aligned modules;

an elongated drive shaft having a perimeter cross-section of said non-circular shape extending axially through and cooperating with the in-register apertures of said aligned modules such that rotation of said drive shaft causes rotation of said screw conveyor, said drive shaft further including an aperture extending coaxially from at least one end of, and into said drive shaft, said aperture in said drive shaft being smaller than said perimeter cross-section and having another non-circular shape;

a journal plug having a mounting end and a drive end and defining an aperture extending axially therethrough, said mounting end of said journal plug defining a size and shape such that rotation of said journal plug causes rotation of said drive shaft;

an attaching means having a first portion connected to said journal plug and a second portion extending coaxially within said aperture of said journal plug; and tension means attached to said second portion for applying an axial force to said attaching means in a direction so as to resiliently maintain said journal plug within said aperture of said drive shaft.

* * * * *